(12) United States Patent
Latham et al.

(10) Patent No.: US 10,230,589 B2
(45) Date of Patent: Mar. 12, 2019

(54) METHODS, SYSTEMS, AND COMPUTER READABLE MEDIA FOR CONFIGURING SERVICE NETWORKS

(71) Applicant: Oracle International Corporation, Redwood Shores, CA (US)

(72) Inventors: Lee Latham, Plano, TX (US); Eamon O'Grady, Old Portmarnock (IE); Timothy Matt, Frisco, TX (US); David C. Campbell, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 431 days.

(21) Appl. No.: 14/569,591

(22) Filed: Dec. 12, 2014

(65) Prior Publication Data

US 2016/0173342 A1    Jun. 16, 2016

(51) Int. Cl.
    *H04L 12/24*    (2006.01)
    *H04L 12/761*   (2013.01)
    *H04L 12/721*   (2013.01)

(52) U.S. Cl.
    CPC ............ *H04L 41/22* (2013.01); *H04L 41/145* (2013.01); *H04L 41/12* (2013.01); *H04L 41/5077* (2013.01); *H04L 45/16* (2013.01); *H04L 45/38* (2013.01)

(58) Field of Classification Search
    CPC ... H04L 41/22; H04L 41/0893; H04L 41/145; H04L 41/12; H04L 41/5077; H04L 45/16; H04L 45/38; G06F 3/0484
    See application file for complete search history.

(56) References Cited

U.S. PATENT DOCUMENTS

| 6,069,630 A  | * | 5/2000 | Lisle ...................... G06F 9/451 |
|              |   |        |                                  715/804 |
| 6,522,629 B1 | * | 2/2003 | Anderson, Sr. ....... H04L 41/022 |
|              |   |        |                                  370/236 |

(Continued)

OTHER PUBLICATIONS

T. Hashimoto, Y. Kamizuru and H. Hata, "A Study of User Interface of On-Demand Overlay Network for Clouds," 2012 9th Asia-Pacific Symposium on Information and Telecommunication Technologies (APSITT), Santiago and Valparaiso, 2012, pp. 1-6.*

(Continued)

*Primary Examiner* — Andrew Lai
*Assistant Examiner* — Hoyet H Andrews, III
(74) *Attorney, Agent, or Firm* — Jenkins, Wilson, Taylor & Hunt, P.A.

(57) ABSTRACT

The disclosed subject matter describes herein methods, systems, and non-transitory computer readable media for configuring service networks. According to one aspect, the method includes collecting parameters defining a network service. In another aspect, the method includes generating a plurality of flow interfaces for modeling the network service based on the collected parameters, wherein each of the flow interfaces is associated with a logical device. In another aspect, the method includes generating at least one packet virtual network (PVN) including at least a portion of the plurality of generated flow interfaces. In another aspect, the method includes visually outputting, in a service network user interface, a graphical representation of the network service based on interface connectivities between the plurality of generated flow interfaces.

8 Claims, 6 Drawing Sheets

(56) References Cited

U.S. PATENT DOCUMENTS

| | | | | |
|---|---|---|---|---|
| 7,197,553 | B2* | 3/2007 | Roberts | H04L 41/12 709/218 |
| 7,266,120 | B2* | 9/2007 | Cheng | H04L 45/16 370/390 |
| 7,433,814 | B2* | 10/2008 | Liu | G06F 9/45537 703/23 |
| 7,483,395 | B2* | 1/2009 | Iwanaga | H04L 12/4675 370/252 |
| 7,525,969 | B2* | 4/2009 | Grant | H04L 12/4641 370/392 |
| 7,555,420 | B2* | 6/2009 | Wang | H04L 29/08846 370/241 |
| 7,680,818 | B1* | 3/2010 | Fan | G06F 17/30286 707/999.103 |
| 7,733,795 | B2* | 6/2010 | Johnson | H04L 41/145 370/241 |
| 7,864,763 | B2 | 1/2011 | Yi | |
| 8,072,992 | B2* | 12/2011 | Deal | H04L 41/0806 370/401 |
| 8,089,905 | B2* | 1/2012 | Umeshima | H04L 12/185 370/256 |
| 8,233,479 | B2* | 7/2012 | Wijnands | H04L 12/18 370/389 |
| 8,868,745 | B1 | 10/2014 | Muley | |
| 9,674,045 | B2 | 6/2017 | Latham et al. | |
| 9,866,408 | B2 | 1/2018 | Latham et al. | |
| 2004/0219493 | A1* | 11/2004 | Phillips | G09B 5/06 434/118 |
| 2005/0021742 | A1 | 1/2005 | Yemini et al. | |
| 2009/0180493 | A1 | 7/2009 | Hirano et al. | |
| 2009/0210523 | A1 | 8/2009 | Duggan | |
| 2010/0100848 | A1* | 4/2010 | Ananian | G06F 3/0482 715/834 |
| 2010/0271955 | A1 | 10/2010 | Atsumi | |
| 2011/0254704 | A1 | 10/2011 | Fournier et al. | |
| 2012/0102383 | A1* | 4/2012 | Liu | G06F 17/215 715/202 |
| 2012/0137240 | A1* | 5/2012 | Krueger | G06T 11/206 715/771 |
| 2012/0297379 | A1 | 11/2012 | Anderson et al. | |
| 2013/0283175 | A1 | 10/2013 | Faridian et al. | |
| 2015/0049641 | A1 | 2/2015 | Pugaczewski | |
| 2015/0117195 | A1 | 4/2015 | Toy | |
| 2015/0156108 | A1 | 6/2015 | Shi | |
| 2016/0173329 | A1 | 6/2016 | Latham et al. | |
| 2016/0173340 | A1 | 6/2016 | Latham et al. | |

OTHER PUBLICATIONS

Hashimoto et al., titled "A Study of User Interface of On-Demand Overlay Network for Clouds," 2012 9th Asia-Pacific Symposium on Information and Telecommunication Technologies (APSITT), Santiago and Valparaiso, 2012, pp. 1-6.*

Hashimoto et al. , titled "A Study of User Interface of On-Demand Overlay Network for Clouds," 2012 9th Asia-Pacific Symposium on Information and Telecommunication Technologies (APSITT), Santiago and Valparaiso, 2012, pp. 1-6. (hereinafter).*

Non-Final Office Action for U.S. Appl. No. 14/569,406 (dated Jun. 27, 2016).

"Functional Design UIM Core-Packet Connectivity—Phase II InvRmiS0373," Communications Information Suite SR3, 4.3 Final Rev. 7, Oracle p. 1-141 (May 27, 2014).

O'Grady, "SR3 Packet Connectivity Overview," Oracle p. 1-35 (Sep. 11, 2013).

Final Office Action for U.S. Appl. No. 14/569,589 (dated May 5, 2017).

Notice of Allowance and Fee(s) Due for U.S. Appl. No. 14/569,406 (dated Feb. 3, 2017).

Notice of Allowance and Fee(s) Due for U.S. Appl. No. 14/569,406 (dated Dec. 7, 2016).

Non-Final Office Action for U.S. Appl. No. 14/569,589 (dated Nov. 17, 2016).

Notice of Allowance and Fee(s) due and Examiner-Initiated Interview Summary for U.S. Appl. No. 14/569,589 (dated Sep. 5, 2017).

Advisory Action for U.S. Appl. No. 14/569,589 (dated Jul. 18, 2017).

Commonly-assigned, co-pending U.S. Patent Application for "Methods, Systems, and Computer Readable Media for Modeling Packet Technology Services Using a Packet Virtual Network (PVN)," (Unpublished, filed Dec. 12, 2014).

Commonly-assigned, co-pending U.S. Patent Application for "Methods, Systems, and Computer Readable Media for Configuring a Flow Interface on a Network Routing Element," (Unpublished, filed Dec. 12, 2014).

"IEEE 802.1ad," http://en.wikipedia.org/wiki/IEEE_802.1ad, pp. 1-4 (Jul. 18, 2014, Downloaded from the Internet Dec. 12, 2014).

"Virtual private network," http://en.wikipedia.org/wiki/Virtual_private_network, pp. 1-6 (Dec. 3, 2014, Downloaded from the Internet Dec. 11, 2014).

"Vision and Strategy Based on Network as a Service Principles," MEF TheThirdNetwork Agile, Assured, Orchestrated, http://www.metroethernetforum.org/Assets/Documents/MEF_Third_Network_Vision_FINAL.pdf, pp. 1-17 (Nov. 2014).

"MEF Technical Specification," MEF 12.2, Carrier Ethernet Network Architecture Framework Part 2: Ethernet Services Layer, http://www.metroethernetforum.org/Assets/Technical_Specifications/PDF/MEF12.2.pdf, pp. 1-60 (May 2014).

"MEF Technical Specificaiton," MEF 10.3, Ethernet Services Attributes Phase 3, https://www.metroethernetforum.org/Assets/Technical_Specifications/PDF/MEF_10.3.pdf, pp. 1-113 (Oct. 2013).

"Ethernet Virtual Connections (EVCs)," Cisco IOS Software Configuration Guide, Release 12.2SY, Chapter 38, http://www.cisco.com/c/en/us/td/docs/switches/lan/catalyst6500/ios/12-2SY/configuration/guide/sy_swcg/ethernet_virtual_connection.pdf, pp. 38-1-38-14 (Sep. 28, 2013).

Oracle Communications Unified Inventory Management, Oracle Data Sheet, http://www.oracle.com/us/industries/communications/045545.pdf, pp. 1-5 (2012).

"MEF Technical Specification," MEF 10.2, Ethernet Services Attributes Phase 2, http://www.metroethernetforum.org/Assets/Technical_Specifications/PDF/MEF10.2.pdf, pp. 1-59 (Oct. 2009).

Appendix A, "Setting Up VLAN Translation," Cisco IP Solution Center L2VPN User Guide, 4.1 http://www.cisco.com/en/US/docs/net_mgmt/ip_solution_center/4.1/l2vpn /user/guide/vlantran.html, pp. 1-8, (2005).

"MEF Technical Specification," MEF 4, Metro Ethernet Network Architecture Framework—Part 1: Generic Framework, http://www.metroethernetforum.org/Assets/Technical_Specifications/PDF/MEF4.pdf, pp. 1-26 (May 2004).

Chapter 13, "Configuring VLANs" Catalyst 2950 Desktop Switch Software Configuration Guide, http://www.cisco.com/c/en/us/td/docs/switches/lan/catalyst2950/software/release/12-1_9_ea1/configuration/guide/scg/swvlan.html#wp1274639, pp. 1-38, (Apr. 2002).

* cited by examiner

METHODS, SYSTEMS, AND COMPUTER READABLE MEDIA FOR CONFIGURING SERVICE NETWORKS

CROSS-REFERENCE TO RELATED APPLICATIONS

This application relates to U.S. patent application Ser. No. 14/569,406, entitled METHODS, SYSTEMS, AND COMPUTER READABLE MEDIA FOR MODELING PACKET TECHNOLOGY SERVICES USING A PACKET VIRTUAL NETWORK (PVN), filed on Dec. 12, 2014 (now U.S. Pat. No. 9,674,045), and U.S. patent application Ser. No. 14/569,589, entitled METHODS, SYSTEMS, AND COMPUTER READABLE MEDIA FOR CONFIGURING A FLOW INTERFACE ON A NETWORK ROUTING ELEMENT, filed on Dec. 12, 2014 (now U.S. Pat. No. 9,866,408). The disclosures of each of the related applications referenced herein are hereby incorporated by reference in their entireties.

TECHNICAL FIELD

The subject matter described herein relates to network service design and visualization. More particularly, the subject matter described herein relates to methods, systems, and computer readable media for configuring service networks.

BACKGROUND

Packet based enterprise network services are complex and engineering centric to design. In most cases the service must connect many disparate customer locations in different geographic places, joining them all centrally using network resources from a core network. In some cases connectivity to a specific customer location may be provided by another communication service provider (CSP). In almost all cases the design of these services today is a manual exercise, supported with a master spreadsheet to track design progress, and is done on a location by location basis over a time period of one to six months, depending on the complexity of the network service. As these services become more of an expected commodity in the industry there is a move to partially automate the design and fulfillment of these services.

To date, there is not an agnostic, technology independent "click-and-go" approach for network service design, configuration, and/or packet connectivity for all major packet based domains. Technology independent models are desired for supporting packet flow inspection, shaping, and configuration at any access point in a packet based network. In addition to this, systems and methods for at least partially automated visual design support and/or adequate modeling for complex multipoint-to-multipoint (MP2MP) services for all major packet based domains do not currently exist.

As a result, a need exists for improved methods, systems, and computer readable media for configuring service networks for agnostic, technology independent modeling of network services, in at least a partially automated manner, having improved efficiency, speed, visual accessibility, ease of use, and reduced design error.

SUMMARY

Methods, systems, and computer readable media for configuring service networks are disclosed. One method for configuring service networks includes collecting parameters defining a network service. The method further includes generating a plurality of flow interfaces for modeling the network service based on the collected parameters, wherein each of the flow interfaces is associated with a logical device. The method further includes generating at least one packet virtual network (PVN) including at least a portion of the plurality of generated flow interfaces. The method further includes visually outputting, in a service network user interface, a graphical representation of the network service based on interface connectivities between the plurality of generated flow interfaces.

The subject matter described herein also includes a system that includes a computing platform comprising at least one processor and memory. In one aspect, the computing platform includes a management module (MM) utilizing the at least one processor and the memory, wherein the MM is configured to collect parameters defining a network service. The MM is further configured to generate a plurality of flow interfaces for modeling the network service based on the collected parameters, wherein each of the flow interfaces is associated with a logical device. The MM is further configured to generate at least one packet virtual network (PVN) including at least a portion of the plurality of generated flow interfaces. The MM is further configured to visually output, in a service network user interface, a graphical representation of the network service based on interface connectivities between the plurality of generated flow interfaces.

The subject matter described herein may be implemented in hardware, software, firmware, or any combination thereof. As such, the terms "function", "node" or "module" as used herein refer to hardware, software and/or firmware components for implementing the feature(s) being described. In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
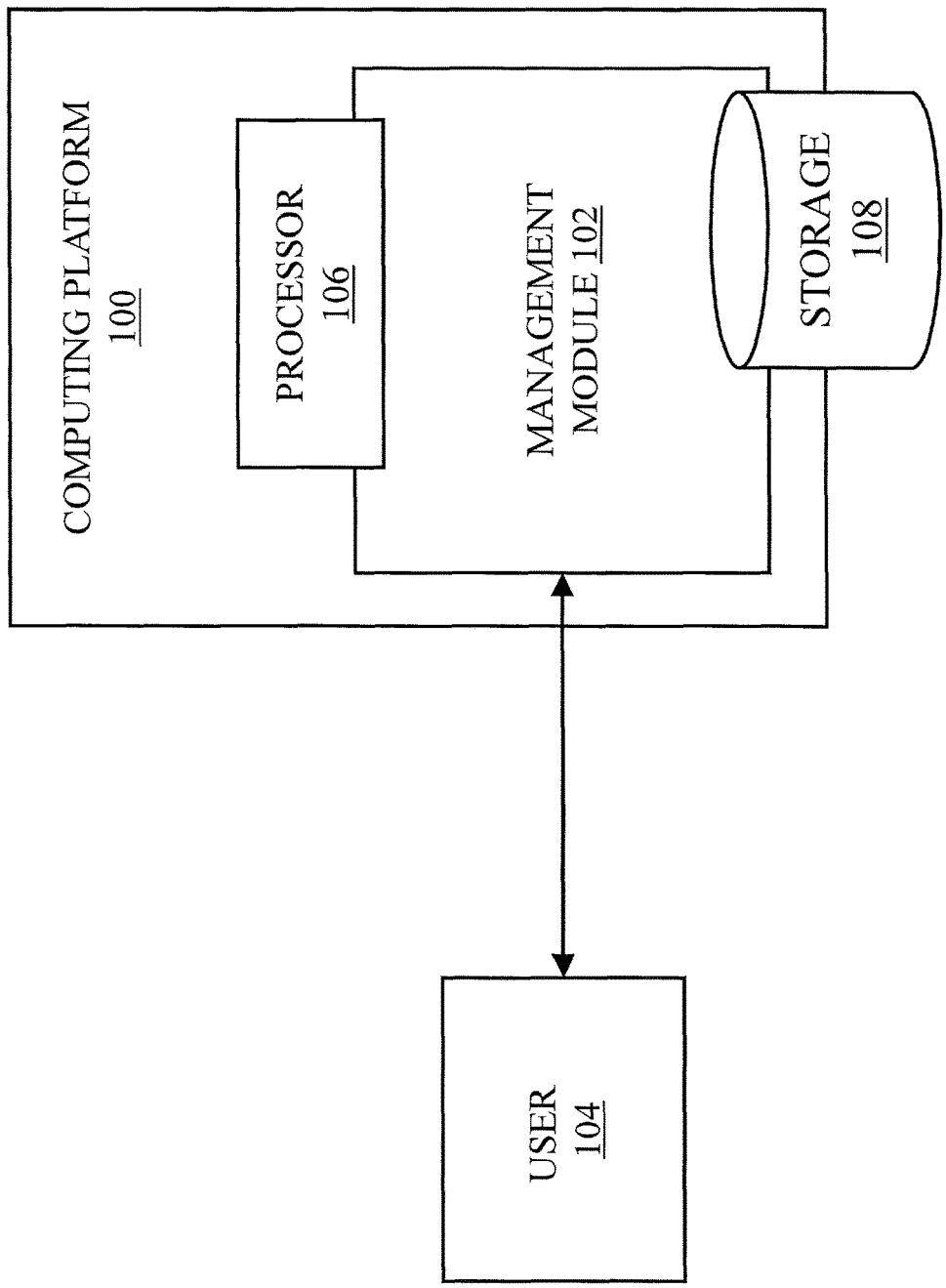
FIG. 1 is a block diagram illustrating an exemplary computing platform for configuring service networks according to an embodiment of the subject matter described herein.

The subject matter described herein relates to methods, systems, and computer readable media for configuring service networks in order to provide a visual container entity incorporating all network resource entities required to design the full network service into a single, visual user experience. When configuring service networks it is desirable to at least partially automate the modeling process in order to improve efficiency, speed, visual accessibility, ease of use, and reduce design error.

In accordance with some aspects of the subject matter described herein, a network service may include data storage, manipulation, presentation, communication and/or other capabilities using client-server or peer-to-peer architecture based on network protocols. For example, a network service may comprise a complex enterprise multiple or single endpoint telecommunications packet technology service. In some aspects, the service network described herein is flexible enough for modeling Ethernet packet based connectivity services (e.g., Ethernet Virtual Circuit (EVC); Operator Virtual Circuit (OVC)) and non-Ethernet packet based connectivity services (e.g., Cloud data services; Asynchronous Transfer Mode (ATM) services; Long-Term Evolution (LTE) backhaul services; Software Defined Networking (SDN) services; etc.). In some embodiments, service networks provide a single integrated solution for enabling Communication Service Providers (CSPs) to model a respective full telecommunication packet based connectivity service and resource inventory in a single system. Service networks may provide CSPs with the tools to manage capacity and plan the evolution, configuration, and/or upgrading of their respective network for enabling them to profitably manage existing capacity for servicing existing customer services.

In some aspects, a requested network service may be virtually modeled by allocating virtual modeling objects representing network resources in either a service network and/or a service configuration, which may be interactively dependent on the other in modeling the network service. For example, a user interface (UI) may allow a user (e.g., a design engineer) to choose to model the network service using either a textual approach (e.g., the service configuration) or a visual approach (e.g., the service network). The UI may allow the user to allocate the network resources in either the service network or the service configuration, where such network resources allocated by the user in one approach may be automatically populated or copied to the other approach. The network resources may comprise node(s) and edge(s), where a node can comprise location(s), equipment(s) at the locations, equipment(s) and part(s) at edge and core network(s), virtual network(s) associating all locations together, and configuration parameter(s) to activate the network service, while an edge may comprise various connectivity(s) that join nodes together. Thus, the service may be designed location by location or from the network core out to the service customer's location using nodes and edges to represent the network resources needed to provide the service.

Specifically, the service network may provide a graphical user interface (GUI) to act as a virtual container entity (i.e., compile all the allocated network resources) for a single, visual experience for the user. For example, when the service network is used within a consumer product, the user may design and model a new network service, or upgrade, downgrade or cease an existing service in a reduced time frame due to the improved efficiency, visual accessibility, and ease of use inherent in the single, interactive visual service network GUI. In addition, the service network may provide a technology independent (e.g., agnostic) model for modeling networks of interconnected packet virtual networks (PVNs), in particular, packet flow inspection, shaping, and/or configuration at any access point in a packet based network or domain of an associated network service. The service networks described herein may be configured to support calculation of change configuration actions to manage complex enterprise service change at a particular ingress/egress and intermediate points in the network service.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary computing platform 100 for configuring service networks according to an embodiment of the subject matter described herein. Computing platform 100 may represent any suitable entity or entities (e.g., a server farm) for configuring service networks. For example, computing platform 100 may comprise a network inventory management system configured to visually model a service using a service network user interface (UI) or textually model the service using a service configuration UI. In some aspects, computing platform 100 may alternate between visually modeling the service using the service network UI and textually modeling the service using the service configuration UI.

In some embodiments, computing platform 100 may be configured to perform one or more aspects associated with configuring service networks. In some embodiments, computing platform 100 may be a stand-alone device or software executing on a processor. In some embodiments, computing platform 100 may be a single node or may be distributed across multiple computing platforms or nodes.

Computing platform 100 may include a management module (MM) 102. MM 102 may be any suitable entity (e.g., software executing on a processor) for performing one or more aspects associated with configuring service networks. As illustrated in FIG. 1, MM 102 is configured as being executable on a processor 106 of computing platform 100. MM 102 may include functionality for generating or modeling network services using either one or both of a service network and a service configuration. For example, MM 102 may configure a visual service network for graphically modeling a network service or a textual service configuration populated with known data about the network service. In this example, an MM user 104 (e.g., a design engineer) may select and/or configure the service network and/or the service configuration via a user interface provided by MM 102. In addition to providing functionality for selection and/or configuration of a service network and/or service configuration, MM 102 may include functionality for storing the service network and/or service configuration for future use. In some embodiments, MM 102 may include functionality for instantiating or initializing the service network and/or service configuration for providing the service network and/or service configuration to other computing platforms or devices. For example, MM 102 may use the service network and/or service configuration to model a service and may provide the modeled service via the service network and/or service configuration to other nodes.

In some embodiments, MM 102 may include or access data storage containing information related to modeling enterprise services. For example, MM 102 may access data storage 108 containing the service network and/or service configuration, as well as data, files, information, etc., regarding the service. Exemplary data storage may include non-transitory computer readable media, such as flash memory, random access memory, or other storage devices. In some embodiments, data storage may be external to and/or or integrated with computing platform 100 and/or MM 102. In some embodiments, MM 102 may save versions of the service network and/or service configuration to data storage 108.

In some embodiments, MM 102 may include one or more communications interfaces for interacting with users and/or nodes. For example, MM 102 may provide a communications interface for communicating with MM user 104. In some embodiments, MM user 104 may be an automated system or may be controlled or controllable by a human user, such as a design engineer. MM user 104 may select and/or configure the service network and/or service configuration for modeling the service using a user interface (UI).

For example, a service order may initially be received at an order and service management (OSM) module (not shown) from a customer entity. For example, a customer entity may transmit a service order in a form of a request message to the OSM module. The OSM module may be configured to receive a message and subsequently send a message (e.g., a capture order message) to an inventory management module indicating that a new enterprise service order has been received from a customer entity. For example, the inventory management module may comprise a management module (MM) 102 (see, e.g., FIG. 1). In response to receiving the message, a service designer module (not shown) in or associated with MM module 102 may create the network service and an associated service configuration UI 300 (see, e.g., FIGS. 3A-3B). In addition, a blank, visual service network UI 200 (see, e.g., FIG. 2) may be subsequently automatically or manually created and added to the network service, where the service designer module may be able to customize the service by allocating resources in the service configuration 300 and/or the service network 200. For example, MM 102 may initially access a network data store (not shown) to obtain network infrastructure information that may be used to implement the requested service. In some embodiments, the network data store comprises a relational database that records and maintains location/address information associated with all of the nodes, routing elements, equipment, and connections existing in the underlying physical infrastructure. In some embodiments, data storage 108 comprises the network data store. Using the data store, the service designer module may then be able to ascertain the network components or resources needed to implement the requested enterprise service. Namely, the service designer module may use the location and/or address information for each network node as a component of the designed service and associated service configuration 300 and service network 200. For example, the designed service comprises information that indicates the type of enterprise service ordered (e.g., E-LAN service) and service configuration 300 contains data (e.g., service location/address information, bandwidth profile information (e.g., 300 Mb/sec), flow identifiers (e.g., CE-VLAN ID 100), and the type of connectivity (e.g., UNI) existing between the target service location and a supporting packet virtual network (PVN)), which may be used to implement the requested service. More specifically, the enterprise service designed by the service designer module may include virtual network components such as flow interfaces (described in detail below) that are associated with physical network components residing in the physical network infrastructure.

Thus, in some aspects, the network service may be created from a machine to machine automated flow, in which case a service specification is accessed from a storage location (e.g., data storage 108) and the network service is created from the required parameters or information in the service specification. In this example, a service configuration is created automatically by MM 102 and each resource added to the service configuration is either automatically imported from the service specification or automatically added and designed by MM 102. Likewise, a service network may be automatically defined by MM 102 and may be configured to be dependent upon (or interdependent with) the service configuration, such that the service network may be automatically populated with network resources (e.g., nodes and edges) corresponding to the network resources provided in the to the service configuration.

While in other aspects, a human user 104 may manually create a new network service based off the required information or parameters in the service specification, where the service configuration and/or service network may be automatically or manually created by user 104. Regardless, the service configuration and the service network may be configured to be interactively dependent on one another such that any changes made to either may automatically update the other. For example, any resources added to the service configuration may be interpreted and automatically added to the service network in the form of edge(s) or node(s), depending on the type of resource added to the service configuration. The converse may also be true, such that any node(s) or edge(s) added to the service network may be interpreted and automatically added to the service configuration in the form of a text resource. This interdependence applies to any changes made in one of the service network and the service configuration, where such changes may include modifying current resources, deleting resources, and/or adding resources. In addition, MM 102 may be configured to model network services based on an existing service. For example, a user 104 may decide to upgrade, downgrade, or cease an existing service. Any changes made to either the service network or the service configuration in order to modify the existing service may be interpreted and automatically copied to the other one of the service network and the service configuration.

It should be noted that computing platform 100 (and/or management module (MM) 102) and its components and functionality described herein can constitute a special purpose computing device that improves the technological field of network service delivery by configuring service networks for at least partially automated visual design support and/or adequate modeling for complex multipoint-to-multipoint (MP2MP) network services for all major packet based domains.

Figure 2:
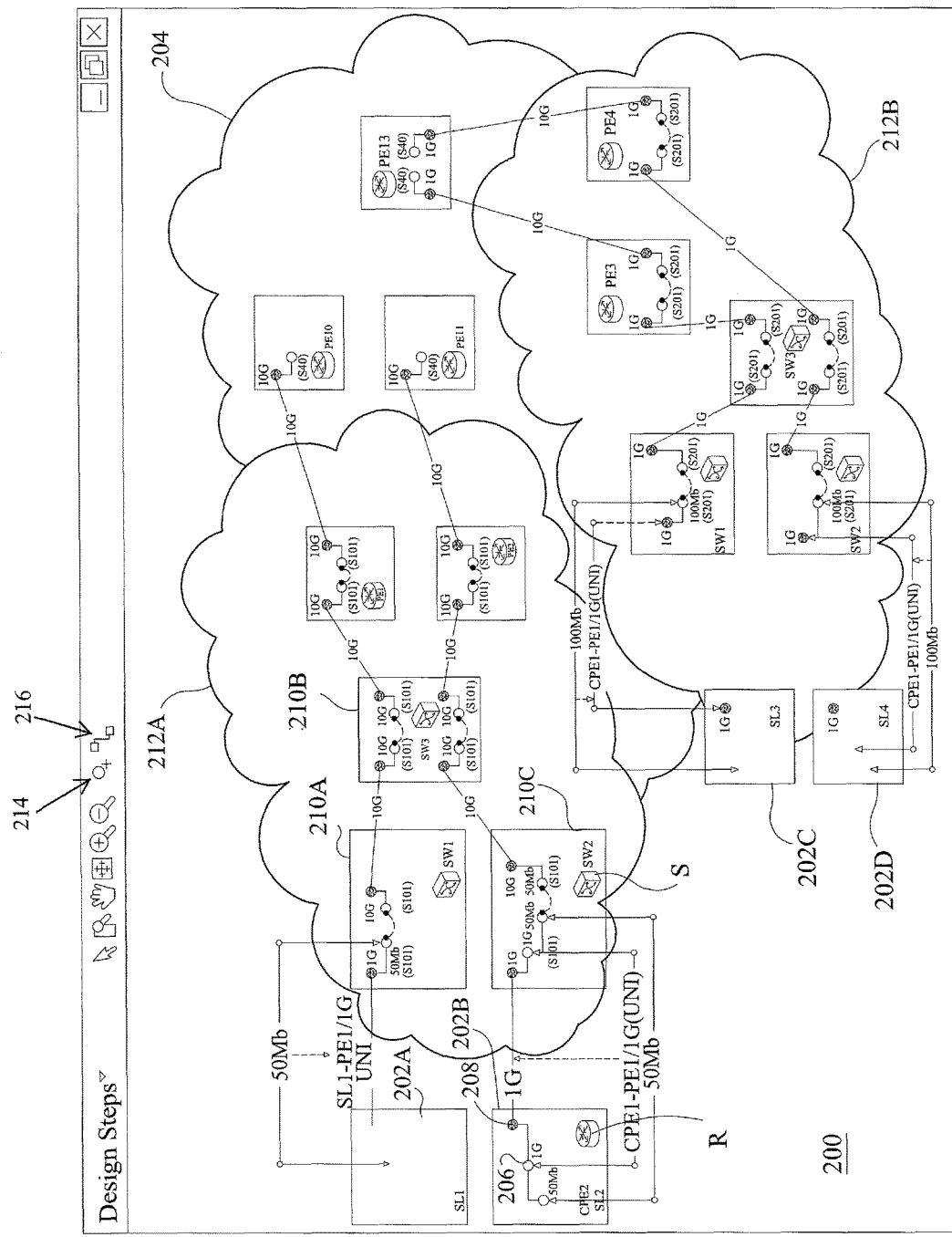
FIG. 2 is line drawing of a computer screenshot illustrating an exemplary service network user interface for configuring service networks according to an embodiment of the subject matter described herein.

FIG. 2 is a line drawing of a computer screenshot illustrating an exemplary user interface for configuring service networks according to an embodiment of the subject matter described herein. In some embodiments, MM 102 and/or associated module(s) or node(s) may include a graphical user interface (GUI), such as a service network, for modeling an enterprise network service. In some embodiments, modeling a network service may include configuring the service network by abstractly provisioning all of the network resources or network resource entities required to design the full service.

Designing or modeling a network service generally requires connecting physical client service location(s) to the service provider network, where the client service location or customer site represents the customer facing origination point for a network service. A client requesting a network service may require service for multiple service locations or a single service location. Typically, the client service location may be considered outside a virtual boundary of the provider or core network, which may be modeled using a packet virtual network (PVN) to be discussed below. In order to connect the client service locations to the destination point or service provider network, various resources may need to be allocated to provide the necessary connections. Such resources may include nodes and edges, each representing different types of resources. For example, a node may comprise location(s), equipment(s) at the location(s), equipment(s) and part(s) at edge and core network(s), virtual network(s) associating location(s) together, and configuration parameter(s) to activate the service, while edges may comprise access connectivity(s) connecting customer location(s) to network location(s) and internetwork connectivity(s) connecting two packet virtual networks.

In FIG. 2, a service network graphical user interface (GUI), generally designated 200, is illustrated. Service network GUI 200 may be configured by MM 102 and may be interactively configurable by a user 104 for provisioning all of the resource allocations for a given network service and providing an interactive visual view of the overall network service as the service is designed and/or modeled. The network service represented by service network GUI 200 may be a newly created service or may be an existing service to be modified. The network service represented by service network GUI 200 may also be technologically agnostic, such that both Ethernet and non-Ethernet packet services may be modeled using network service GUI 200.

Figure 3A:
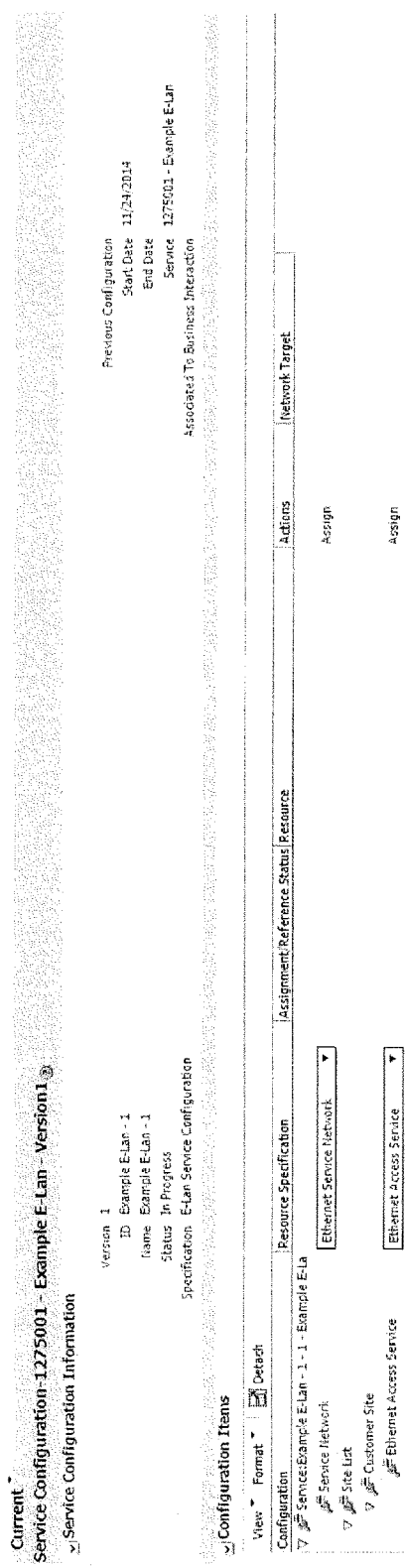
FIG. 3A is a computer screenshot illustrating an exemplary service configuration user interface prior to generating a plurality of flow interfaces and at least one packet virtual network (PVN) according to an embodiment of the subject matter described herein.
Figure 3B:
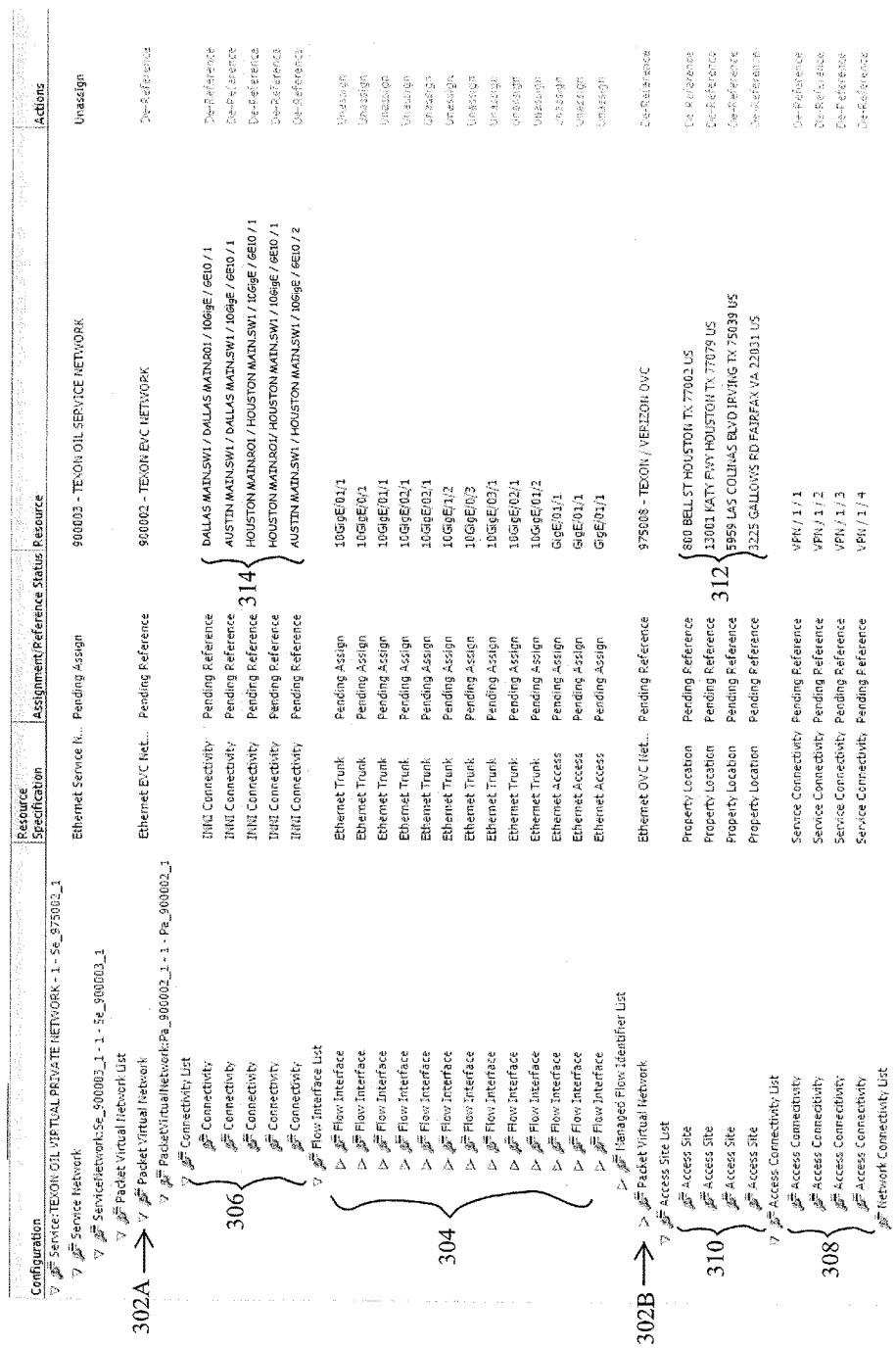
FIG. 3B is a computer screenshot illustrating an exemplary service configuration user interface after generating a plurality of flow interfaces and at least one packet virtual network (PVN) according to an embodiment of the subject matter described herein.

FIGS. 3A-3B illustrate computer screenshots of an exemplary service configuration UI, generally designated 300. Service configuration 300 may be created automatically or manually upon creation of the ordered network service, as discussed above. In some embodiments, where the network service has been created manually by a user 104 after user selection of an appropriate service specification, service configuration 300 may be updated manually by user 104 or automatically with the network resources necessary for design and/or implementation of the ordered service. Specifically, service configuration UI 300 may be updated where resources are textually added, imported, assigned, referenced, etc. In another embodiment, service configuration UI 300 may be updated at least partially automated and at least partially manually.

Regarding FIG. 3A, a computer screenshot of service configuration UI 300 is illustrated prior to any resources being allocated for the ordered service. By comparison, FIG. 3B illustrates a computer screenshot of service configuration UI 300 after resources have been added to an Ethernet EVC service. In FIG. 3B, the computer screenshot illustrates two packet virtual networks (PVNs) 302A and 302B that have been allocated for the Ethernet EVC service. A plurality of flow interfaces 304 are also illustrated in FIG. 3B, where such flow interfaces have been allocated within PVN 302A. Each of the flow interfaces 304 in FIG. 3B additionally comprise a specific network location code 314 describing the virtual initiation and/or termination points for parent connectivity of the packet flow, as well as the rate code for the service. For example, DALLAS MAIN.SW1 is a location code for a physical interface in "Dallas, Tex." at which the parent connectivity initiates, while DALLAS MAIN.R01 is a location code for a different physical interface in "Dallas, Tex." at which the same parent connectivity terminates. A detailed explanation of flow interfaces may be found in reference to FIG. 4.

In addition, multiple textual edges, such as, for e.g., INNI connectivities 306 within packet virtual network (PVN) 302A, as well as access connectivities 308 between PVNs, interfaces, and service locations, are illustrated in FIG. 3B. Access sites 310, referring to customer service locations, are further illustrated in FIG. 3B with the address of the service location 312 being listed as well.

To note, although in FIG. 3B the ordered service is an Ethernet EVC service, service configuration UI 300, as well the service network UI 200 illustrated in FIG. 2, may be configured to model technology agnostic services, meaning they can be used to model generic service flows, i.e., Ethernet and non-Ethernet packet based technologies. Thus, the resources allocated in the service configuration UI 300 may also be used to model non-Ethernet packet based technologies.

Accordingly, service network GUI 200 may be dependent upon or interdependent with service configuration 300. Where service network GUI 200 is configured to be dependent upon service configuration 300, any resource allocations, modifications, and/or removals to the network service made in service configuration UI 300 may be copied to service network GUI 200. Where service network GUI 200 is configured to be interdependent with service configuration UI 300, resource allocations, modifications, and/or removals to the network service made in either one of service configuration UI 300 or service network GUI 200 may automatically populate into the other. For example, a resource allocation in the form of a service location node (e.g., 202A) made in service network GUI 200, may automatically populate the service configuration as a text input corresponding to an access site 310 with an address of the service location (see, e.g., 312, FIG. 3B), while a textual input of an access site 310 with a service location address 312 in the service configuration UI 300 may automatically populate service network GUI 200 as a node corresponding to the service location (see, e.g., 202A, FIG. 2). The same interactive dependency is also true for changes made to the overall network service (e.g., upgrading, downgrading, and/or ceasing the service). For example, ceasing the service in service configuration UI 300 will also cease the service in service network GUI 200, and vice versa. As a result, the service network GUI 200 may correspond to a unique service configuration UI 300 associated with a network service.

In some embodiments, after a network service and an associated service configuration are created, MM 102 may include functionality to automatically create a blank service network GUI 200. This allows user 104 complete autonomy to design and/or model the network service using visual representations (e.g., nodes and edges) to indicate the connectivity and flow of the service, which may be textually represented in a service configuration (e.g., FIG. 3B). Since service network GUI 200 may be configured to be interdependent on a service configuration, any allocations, modifications, and/or removal of resources done in service network GUI 200 may be automatically recorded in a textual manner in the service configuration UI 300. For example, the changes may be tracked inside the Service Configuration (e.g., 300, FIG. 3B) and Service Network Configuration(s) (e.g., 200, FIG. 2) which allows an activation process to determine what has changed and send the appropriate commands to the correct network elements.

In other embodiments, for example, MM 102 may include the functionality to automatically create service network GUI 200 based on existing content (e.g., files and directories) and/or a service specification associated with the network service and/or the service configuration. In such a case, service network GUI 200 may not be totally blank and may contain at least some textual content from the service configuration that may be graphically represented as a node or edge (depending on the content). Thus, at least a portion of the service may be already modeled in service network GUI 200 when user first initiates service network GUI 200. In some embodiments, where the service networks are configured to be interdependent with the service configuration, modeling a network service may be accomplished using either one of the approaches exclusively, or as a combination between the two approaches.

Regardless, when user 104 chooses to utilize service network GUI 200 to model a service, MM 102 may provide user interface elements to enable user 104 to visually provision and/or configure the service network in a customized manner. For example, at least one tool bar menu may provide accessible options for user 104 to select in order to model an enterprise service in service network GUI 200. Such options may include adding content objects, assigning content objects, importing content objects, etc., where the content objects may include interconnected objects that may define, implement, or otherwise describe an aspect of the service. Other basic interface elements (e.g., tools) may be included that allow user 104 to manipulate the graphical user interface, such as, for example, zooming in and/or out, toggling the screen, etc. Where MM 102 is implemented on a computing platform 100 that comprises a touch screen, user 104 may be able to interact with the user interface elements of service network GUI 200 by direct contact (e.g., finger contact) on the part of user 104. Furthermore, computing platform 100 may comprise a control device, such as a trackball or a touchpad (of the multi-touch type or not), that may be linked to the screen and enable user 104 to control movement of a cursor on the screen in order to act on the user interface elements. Alternatively, computing platform may only comprise a control device and may not be configured for direct contact by user 104 on a screen.

In the embodiment of service network GUI 200 illustrated in FIG. 2, interaction (direct or otherwise) with user interface elements in service network GUI 200 may be configured to import content objects (e.g., resources) into the service network that may not be automatically populated upon creation of the service network GUI 200. For example, such content objects may comprise resources corresponding to basic building blocks of the service, e.g., nodes and/or edges. To import resources into service network GUI 200, a tool bar menu may include functionality to display resources that may be imported and/or allow user 104 to select the resources to be imported. Resources may be imported from data storage 108 or from another storage location having content associated with the service being modeled.

Furthermore, in the embodiment illustrated in FIG. 2, service network GUI 200 may be configured such that interaction with user interface elements in service network GUI 200 may allow user 104 to add, modify, remove, or assign content objects (e.g., resources) for modeling the network service. The resources may be represented using unique graphical representations that may visually and recognizably identify the virtual and/or physical resources corresponding to that graphic. For example, in FIG. 2, a tool bar menu is provided in an upper portion of service network GUI 200. In this example, adding a node (i.e., an interface) may be graphically represented by a circle with a "plus" sign, 214, while adding an edge (connectivity) may be represented by two boxes with a connecting line, 216.

To begin modeling an enterprise service using a service network GUI 200, a user 104 may manually create a service network GUI 200 after creation of a corresponding service and service configuration (see, e.g., 300, FIG. 3B), or a service network GUI 200 may be automatically created and populated upon creation of the associated service and service configuration (see, e.g., 300, FIG. 3B). In some embodiments, manual creation of a service network may require user 104 to assign the service network to the corresponding service and/or service configuration using a service network specification containing an identification number of the service. Other ways of associating the service network and the service configuration may also be implemented if the service network is not configured to be automatically created and populated.

In some embodiments, the service network GUI 200 may comprise a topological representation of the network service connectivity without any concern of the actual geographical location of any allocated resources. Thus, when designing and/or modeling a newly created service in service configuration GUI 200, user 104 may choose to design the service network in any number of ways. For example, user 104 may choose to design the service location by location or from a network core out to the service location(s) by allocating resources (e.g., nodes that represent location(s), equipment(s), port(s), or interface(s); and edges that represent connectivity(s)) to connect the service together. This flexibility allows user 104 to design a technology agnostic service in whatever manner is most comfortable and intuitive. In addition, such flexibility allows more complex multi-point to multi-point (MP2MP) services to be designed as a single network having node(s) and edge(s), whereas traditionally, MP2MP services were each modeled as a collection of point to point (P2P) services each having a P2P circuit grouped together with a group label.

Service network GUI 200 may be associated with a newly created or existing service (e.g., an enterprise service). Thus, when designing and/or modeling a service, user 104 may initially determine the number of service locations needing connectivity to the virtual core network. Network services may comprise multiple service locations or a single service location. For example, in service network GUI 200, four service locations are visually illustrated as nodes 202A-202D. Such service locations 202A-202D may be imported from database 108, or another storage location, and/or may be created by user 104 in service network GUI 200. Where service location(s) are imported into GUI 200, user 104 may select which service location(s) to import, the service location(s) having already been associated with the service and defined by address, property name, service identification, service name, and/or service status. Alternatively, user 104 may choose to create service location(s) in service network GUI 200 based on parameters and/or specifications regarding the service. Accordingly, service location(s) may be graphically illustrated in GUI 200 and accompanied by at least one defined textual identifier. For example, in FIG. 2, service locations 202A-202D are each visually illustrated by squares and are accompanied by a service name (i.e., SL1, SL2, SL3, SL4). However, service locations 202A-202D may be visually represented by other geometric shapes and/or designs and may include a defined textual identifier in addition to or other than the service name.

In order to model the service, each service location must be connected to a virtual core network, since typically, service locations are not within the virtual core network. In FIG. 2, the virtual core network is designated 204, and is represented by a cloud in order to represent that core network 204 is a network abstraction and not a physical entity. As illustrated in FIG. 2, none of service locations 202A-202D are within the boundaries of core network 204. Thus, user 104 may design connectivity between core network 204 and each service location 202A-202D, by designing the service by individual location to service location or from network core 204 out to service locations 202A-202D.

In order to provide such connectivity, user 104 may allocate additional nodes and edges between service locations 202A-202D and core network 204. These additional resources may be either virtual or physical resources that may be provisioned at each service location and/or between service locations 202A-202D and core network 204 to model packet flow of the network service. For example, the resources may include logical devices, interfaces, equipment, packet virtual networks, parties, service connectivities, packet connectivities, etc.

In some aspects, logical devices may be utilized to model an enterprise service. Such logical devices may include interfaces, ports, routers, switches, hubs, etc., which are each configurable via a tool bar menu and may each be represented in service network GUI 200 by a unique graphical representation. For example, in service location 202B, a routing element to be utilized in modeling the service is illustrated by a cylindrical graphical representation, R, indicative of a routing element, while a switching element 210C to be utilized in modeling the service is illustrated by a rectangular prism graphical representation, S, indicative of a switching element. The graphical representations of the logical devices may also be specific as to whether the device is provider facing or customer facing.

In some aspects, a logical device may be utilized at a service location or another geographic location where the network service is provided or flows through. For example, in FIG. 2, service location 202B comprises a routing element, and three interfaces, while service locations 202C and 202D comprise one interface each. In other aspects, a logical device may be topologically modeled in service network GUI 200 independent of a geographic location in order to topologically model the service. For example, in FIG. 2, switching elements 210A-210C are modeled without the constraints of tying them to a specific geographic location. As a note, although service network GUI 200 provides a topological view of the network resources of the designed network service, a corresponding service configuration (e.g., 300, FIG. 3B) may include resource information regarding the geographic location of the logical device.

Figure 4:
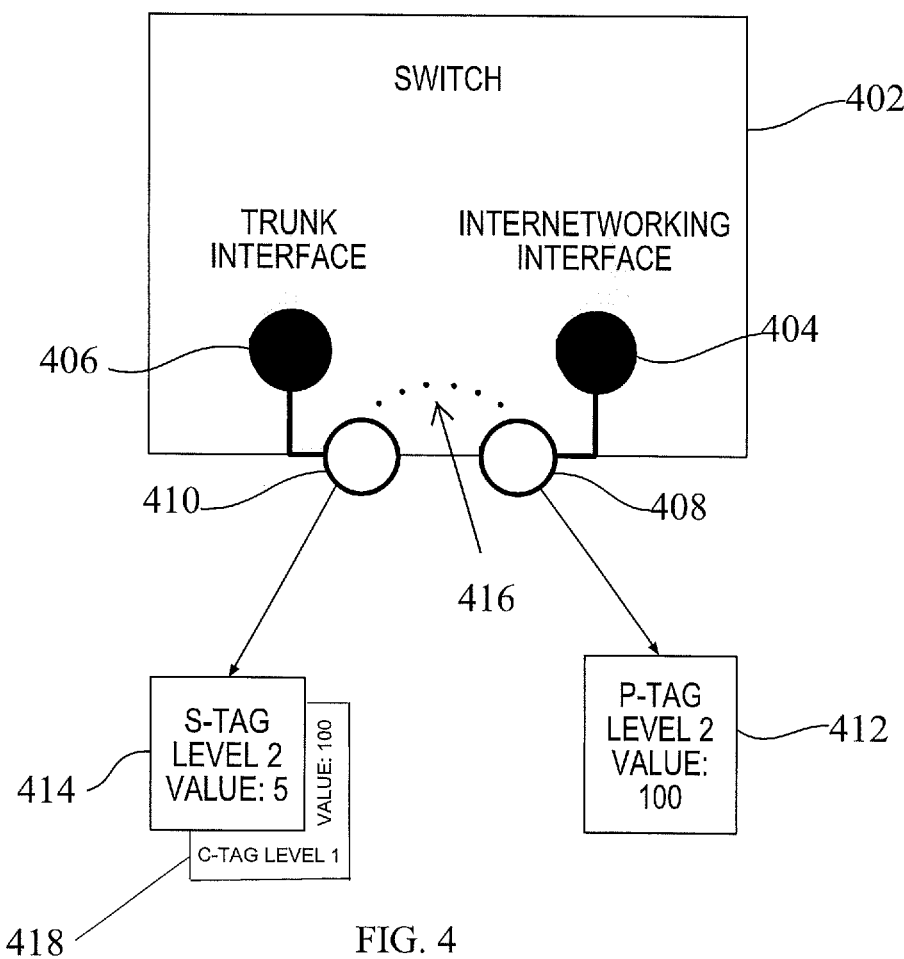
FIG. 4 is a block diagram illustrating an exemplary switching element usable in a service network user interface according to an embodiment of the subject matter described herein.

By selecting and placing the unique graphical representation of the logical device to be used in modeling the service in service network GUI 200, the structural and/or virtual components of the logical device may be visible to user 104. However, user 104 may have the option to display more or less information regarding each allocated network resource of the modeled service. As an example, FIG. 4 illustrates a block diagram of a logical representation of an exemplary switching element 402, including the structural and/or virtual components of the logical device, which is configured to utilize flow interfaces and media interfaces according to an embodiment of the subject matter described herein. In some aspects, the exemplary switching element 402 illustrated in FIG. 4 may be a more detailed overview of a switching element present in service network GUI 200 (e.g., 210A-210C, FIG. 2). Once switching element 402 is placed in a service network GUI, user 104 may have the option of drilling into switching element 402 in order to discern the virtual and/or physical interfaces present in the logical device.

These virtual and/or physical interfaces may optionally be chosen to be displayed in service network GUI 200 for a more detailed overview of the service or may be collapsed so that a more general overview of the service is visible. User 104 may opt to do this for individual logical devices or for all, and can toggle between different display options where desirable. The interfaces may be, for example, but not limited to, a flow interface and a media interface. As used herein, a flow interface includes a logical portioning or partitioning of a media interface (i.e., a representation of the physical capabilities, or, packet flow capacity of a port) to support a controlled flow (e.g., bit rate) of a service being delivered to a customer service location. In some embodiments, the flow interface may constitute a virtual entity that is extended from a logical device's media interface for use as a sub-interface to track and/or manage flow identifiers (e.g., virtual local area network (VLAN) identifiers) mapped to the logical devices residing in the underlying physical infrastructure of the service. It is important to note that a flow interface may be associated with (e.g., mapped to) a port or media interface of a physical logical device (e.g., a router, switch, hub, etc.) through which packet traffic flows, although graphically displaying said media interface may not be necessary.

As shown, in FIG. 4, switching element 402 may include a plurality of media interfaces, such as a trunk interface 404 and an internetworking interface 406, which are configured to receive and send packet traffic communications. Each of trunk interface 404 and internetworking interface 406 may be associated with an underlying physical device interface (e.g., a physical port) that is adapted to receive the packet traffic communications at the physical layer. Notably, each of interfaces 404-406 may be respectively logically partitioned by the CSP to include one or more flow interfaces. As shown in FIG. 4, a flow interface 408 may be configured on trunk interface 404, and flow interface 410 may be configured on internetworking interface 406. Each of flow interfaces 408-410 may be designed and generated by a CSP host server (not shown), which in turn systematically provisions the flow interfaces to receiving network elements. In some embodiments, the CSP host server may send activation commands, which contain flow interface information, to network elements designated for fulfilling the requested enterprise service. For example, upon receiving an activation command including a flow interface from a CSP host server, switching element 402 may configure a media interface (e.g., one of interface 404-406 as specified in the activation command) in accordance to the contained flow interface information. For example, the received flow interface information may include a port identifier, a flow interface bit rate, and a flow identifier (as shown by flow identifiers 412, 414, 418 in FIG. 4). Using the flow interface information, switching element 402 may configure a flow interface that is capable of establishing a connectivity at the specified bit rate on a media interface associated with the port identifier. As additional flow interfaces are configured on switching element 402, two or more flow interfaces may be logically linked together to form a flow cross-connect (e.g., cross-connect 416) that serves to implement the service.

Referring back to FIG. 2, a flow interface may be visually illustrated as a node 206, while a media interface may be visually illustrated as a node 208 in a service network GUI. For ease of visual distinction between the two different types of interfaces, the flow interface and the media interface may be depicted in different manners. For example, in both FIGS. 2 and 4, media interfaces are shaded in or otherwise patterned, while flow interfaces are not. Other types of patterns, colors, shapes, shading, etc., may be used to distinguish between the two, or none need be used at all.

In order for service location connectivity to core network 204, various other flow points or locations having network resources may be necessary, where these flow points may not be service locations for the particular service. In fact, these various flow points may make up a packet virtual network (PVN). In some aspects, a PVN may generically model packet connectivity nodes (flow interfaces) and edges (access, internetwork, and/or trunk connectivity) for any type of packet based technology. Thus, a PVN may be configured to connect one or more service locations and/or other network resources (i.e., nodes and/or edges) together in a connectivity design.

Accordingly, a PVN comprises a single, virtual network unit by which the service (or one leg of a service) may be modeled efficiently for a variety of CSPs, regardless of the type of packet based technology (e.g., Ethernet and non-Ethernet). As illustrated in FIG. 2, multiple PVNs may be used when modeling a service as a visual service network. In FIG. 2, full service connectivity is illustrated through the access networks, 212A, 212B, while only internetwork connectivity is illustrated to core network 204. Packet virtual networks 204, 212A, 212B are a network abstraction for connecting each customer service location, as well as the network resources necessary for connecting the service locations to core network PVN 204. Alternatively, a single PVN may be adequate for modeling a service network for an associated service. Consequently, a service network may comprise a PVN or multiple PVNs for tying the different network resources together into a single model for visually depicting the connectivity and design of a service (e.g., a multipoint enterprise service).

In some embodiments, connectivity throughout the service may be visually illustrated in service network GUI 200 using edges. Edges may consist of service connectivities, network access connectivities, packet connectivities, cross connects, access connectivities, internetwork connectivities, trunk connectivities, etc. Each type of connectivity may illustrate a different type of flow of the service at various nodes, where such nodes may consist of service location(s), logical device(s), PVN(s), equipment(s), etc. In service network GUI 200, user 104 may provision connectivity(s) between nodes and/or within nodes by selecting the graphical representation of a create edge functionality 216. Different types of edge connectivities may have different graphical representations or one type of graphical representation may be descriptive of all types of edge connectivities, where user 104 may be able to further specify in a drop down window, pop up window, etc., the type of edge connectivity desired. Conversely, in some embodiments connectivities may already be specified in the service configuration. Since the service configuration UI and service network GUI 200 may be interdependent, any connectivities created and/or specified in the service configuration UI 300 (whether already known from the service order or textually designed by user 104 in the service configuration) may automatically populate service network GUI 200.

Some examples of edges illustrating a provisioning of network service connectivities are shown in FIG. 2. For example, at service location 202A, an edge visually representing an Ethernet service connectivity is illustrated by an arrow labeled 50 Mb that is also connectedly provisioned to switching element 210A. In another example, at service location 202C, an edge visually representing a different Ethernet service connectivity is illustrated by the arrow labeled 100 Mb. Notably, the methods, systems, and computer readable media described herein may be used to model, and therefore, visualize both Ethernet and non-Ethernet packet based technologies. Thus, within an overall service, the different service locations may purchase different network services.

Network access connectivities may also be represented by edges within the service network. Network access connectivities may be represented between each service location and the subsequent node. For example, a User Network Interface (UNI) access connectivity between a flow interface at a service location and a flow interface at a logical device may be illustrated in a service network GUI, such as, for example, service network GUI 200 in FIG. 2. However, access connectivities may include any type of suitable interface, not limited to a User Network Interface (UNI). Any type of access interface may be provided. For example, a service location (e.g., 202B, FIG. 2) may not be within the abstracted boundaries of a PVN (e.g., 212A, FIG. 2), while a logical device (e.g., 210C, FIG. 2) connected to the service location may be. However, since using service network GUI 200 to model the packet flow does not require the logical device to be tied to any specific geographic location within service network GUI 200, the logical device may be located any geographic distance apart from the connected service location. Thus, the UNI connectivity being described in the above example may terminate a first access connectivity at the logical device.

Edges representing flow cross connects may also be seen in FIG. 2. For example, at switch 210A, an edge visually representing a flow cross connect is illustrated by the curved dotted line between the two flow interfaces 206. While the flow cross connect at the flow interfaces of switch 210A is not a physical entity, provision of the flow cross connect is useful in visually depicting how the network service flows at a particular logic point in the service network. Likewise, at switch 210B two flow cross connects are illustrated each between separate flow interfaces.

Accordingly, FIG. 2 is a detailed view of the overall service. While such a view may be of interest to user 104 or other users associated with providing the service to the client, the client may not be interested in seeing such a detailed view. Thus, the extraneous details may be collapsed (such as text detailing the connectivity), such that only those node(s) and edge(s) of interest may be shown.

As a result, a network service may be modeled within service network GUI 200, as shown in FIG. 2. As described herein, the network service may also be modeled using only a service configuration or a combination of a service configuration and/or a service network. This flexibility in approach modeling the service is desirable because it enables easier customization of the ordered service. Where the service network and the service configuration are configured to be interactively dependent on one another, any modifications made in either of the service network and the service configuration will automatically populate to the other. In particular, MM 102 may be provided with the functionality so that any modifications made to the network service, whether made in the service configuration or in the service network, may be automatically saved as a new version of the service network in data storage 108 or any other related storage location. Thus, MM 102 supports versioning of the network service so that change may be managed for the service and provides a history of versions of the service network.

Figure 5:
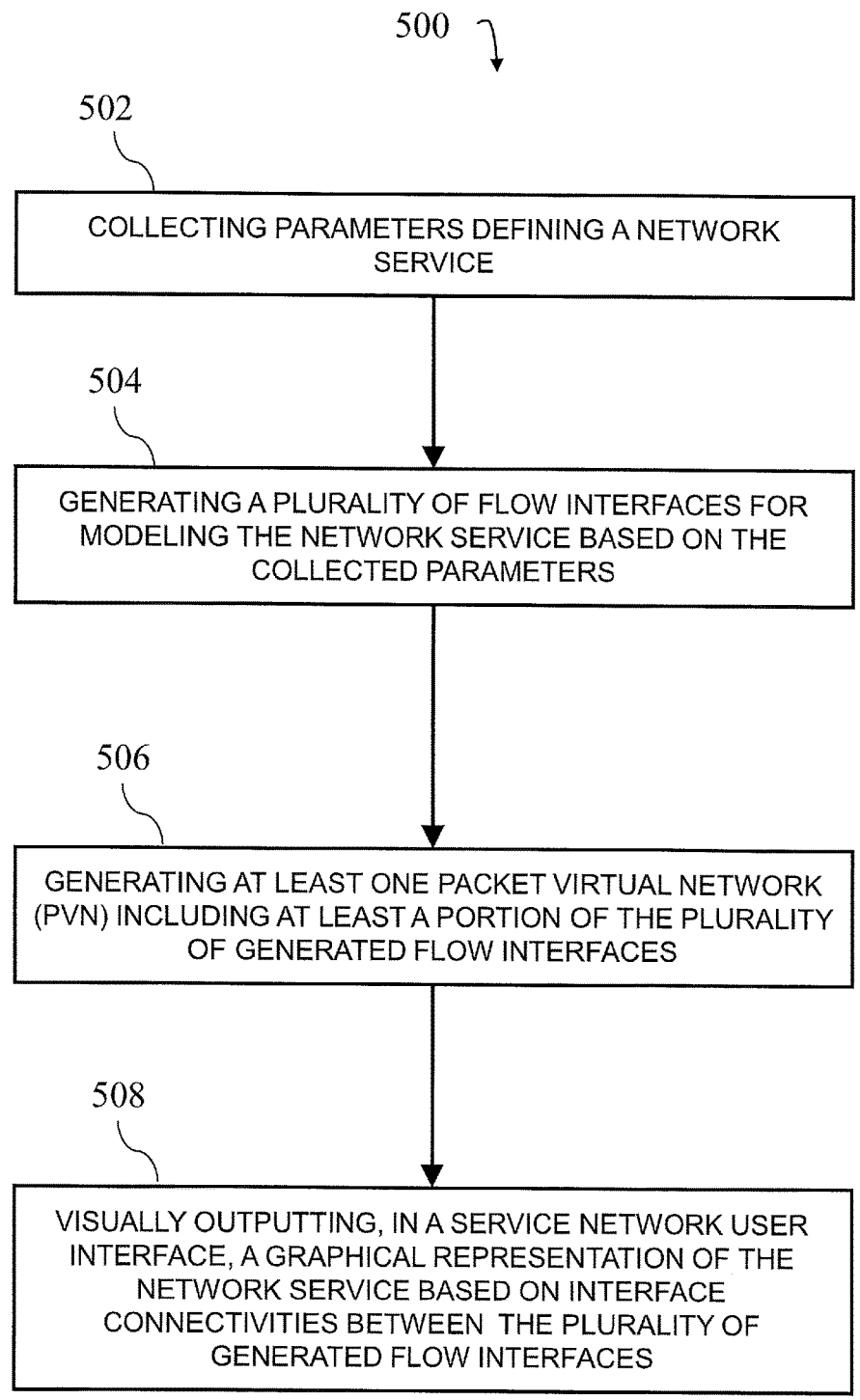
FIG. 5 is a flow chart illustrating an exemplary process for configuring service networks according to an embodiment of the subject matter described herein.

FIG. 5 is a flow chart illustrating an exemplary process for configuring service networks according to an embodiment of the subject matter described herein. In some embodiments, exemplary process 500, or portions thereof, may be performed by or at computing platform 100, MM 102, and/or another node or module. At block 502, parameters defining a network service may be collected. For example, a service specification associated with a service order may provide parameters regarding implementation of the desired network service. For example, the parameters may comprise an identification number of the service, service location/address information, flow identifiers (e.g., CE-VLAN ID 100), bandwidth profile information (e.g., Committed Information Rate (CIR) 300 Mb/sec), and the type of connectivity (e.g., UNI).

In some embodiments, the parameters may be collected from a machine to machine automated flow, while in other embodiments the parameters may be collected manually from a service specification associated with the network service.

In some embodiments, the network service may comprise a multi-point to multipoint (MP2MP) Ethernet and/or a non-Ethernet packet technology service. In other embodiments, the service is a point to point (P2P) Ethernet and/or a non-Ethernet packet technology service.

In some embodiments, the packet technology service may comprise an Internet service, a Web service, a streaming service, an Electronic-Mail (E-Mail) service, a phone service, a Voice over IP (VoIP) service, a Direct Internet Access (DIA) service, an Internet Protocol Television (IPTV) service, or a Virtual Private Network (VPN) service.

At block 504, a plurality of flow interfaces for modeling the network service based on the collected parameters may be generated. The plurality of flow interfaces may be pre-configured, user defined, provisioned, and/or accessed from a pool of network resources using management module 102. As illustrated in FIG. 2, each of the flow interfaces may be associated with a logical device. For example, each of the flow interfaces may be associated with a port, router, switch, hub, etc.

At block 506, at least one packet virtual network (PVN) including at least a portion of the plurality of generated flow interfaces may be generated (e.g., 212A, 212B, FIG. 2). At least a portion of the plurality of generated flow interfaces may be configured and/or visually connected or grouped for representing network devices (e.g., or device sub-interfaces thereof) and/or connectivity within an underlying infrastructure modeled by the PVN.

At block 508, a graphical representation of the network service based on interface connectivities between the plurality of generated flow interfaces may be visually output in a service network user interface. The service network user interface (e.g., 200, FIG. 2) may be a graphical user interface (GUI) of the network service, such that visually outputting a graphical representation of the network service may provide a user 104 with a visual representation of the overall network service. Especially for complex network services, such as, e.g., MP2MP packet technology services, the functionality of visually outputting a graphical representation of said service is advantageous for modeling the service as a whole.

In some embodiments, method 500 may further comprise associating a service configuration with the network service (e.g., 300, FIGS. 3A-3B). For example, the service configuration may contain the parameters defining the network service (e.g., service location/address information, bandwidth profile information (e.g., 300 Mb/sec), and the type of connectivity (e.g., UNI) existing between a target service location and a supporting packet virtual network (PVN)), which may be used to implement the requested service.

In some embodiments, associating a service configuration with the network service may be accomplished via a user 104. For example, a new network service may be created manually by user 104 based on the parameters contained in a selected service specification. Thus, the service configuration may be created manually or automatically upon creation of the network service, and the service configuration may be populated manually, by the user, with the parameters from the selected service specification.

In some embodiments, method 500 may further comprise textually outputting, in the service configuration user interface (e.g., 300, FIG. 3A-3B), a textual representation of the network service based on interface connectivities between the plurality of generated flow interfaces and the at least one generated PVN.

In some embodiments, the method 500 may further comprise implementing the network service. For example, the network service may be implemented using an order and service management (OSM) module (not shown) that is configured to implement the network service. In some embodiments, implementing the network service may include at least one of: provisioning the network service, upgrading the network service, downgrading the network service, and ceasing the network service. Likewise, for example, the OSM module may be configured to provision the network service, upgrade the network service, downgrade the network service, and cease the network service.

In some embodiments, method 500 may further comprise configuring the service configuration user interface 300 and the service network user interface 200 to be interdependent on one another, such that generating the plurality of flow interfaces and/or the at least one PVN in one of the service network user interface or the service configuration user interface outputs the at least one generated plurality of flow interfaces and/or the at least one generated PVN to the other of the service network user interface or the service configuration user interface.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for configuring a service network, the method comprising:
   at a computing platform:
      collecting parameters defining a network service, wherein the network service comprises a multi-point to multi-point (MP2MP) Ethernet and/or a non-Ethernet packet technology service;

generating a plurality of flow interfaces for modeling the network service based on the collected parameters, wherein each of the flow interfaces is associated with a logical device;

generating at least one packet virtual network (PVN) including at least a portion of the plurality of generated flow interfaces; and displaying, in a first screen of a graphical user interface on a computer screen, a graphical representation of the network service based on interface connectivities between the plurality of generated flow interfaces, including displaying a graphical depiction of the at least one generated PVN;

displaying, in a second screen of the graphical user interface on the computer screen, a textual representation of the network service based on the interface connectivities between the plurality of generated flow interfaces and the at least one generated PVN, wherein displaying the textual representation includes displaying a service configuration of the network service populated with at least the collected parameters, and wherein displaying the textual representation includes displaying the at least one PVN and the portion of the plurality of generated flow interfaces by displaying a textual network name of the PVN and a nested list of textual edges for each generated flow interface of the portion of the plurality of generated flow interfaces; and configuring the graphical user interface such that the graphical representation of the network service and the textual representation of the network service are interactively interdependent on one another, including automatically updating both the first and second screens of the graphical user interface in response to changes made to either the graphical representation of the network service or the textual representation of the network service, including:

receiving, from a user, textual input in the second screen of the GUI modifying the service configuration of the network service and automatically updating the graphical representation of the network service; and receiving, from the user, graphical input in the first screen of the GUI modifying the graphical representation of the network service and automatically updating the service configuration of the network service;

wherein receiving, from a user, textual input in the second screen of the GUI modifying the service configuration of the network service and automatically updating the graphical representation of the network service comprises receiving a textual input of an access site with a service location address and automatically populating the graphical representation of the network service with a node representing the access site, and wherein receiving, from the user, graphical input in the first screen of the GUI modifying the graphical representation of the network service and automatically updating the service configuration of the network service comprises receiving a resource allocation in the form of a service node and automatically populating the service configuration with a textual representation corresponding to a different access site with an address of the service location.

2. The method of claim 1, wherein the collected parameters comprise at least one of: an identification number of the network service, service location and/or address information, bandwidth profile information, and a type of interface connectivity.

3. The method of claim 1, wherein the packet technology service comprises an Internet service, a Web service, a streaming service, an Electronic-Mail (E-Mail) service, a phone service, a Voice over IP (VoIP) service, a Direct Internet Access (DIA) service, an Internet Protocol Television (IPTV) service, or a Virtual Private Network (VPN) service.

4. The method of claim 1, wherein collecting the parameters includes at least one of: collecting the parameters from a machine to machine automated flow, and collecting the parameters manually from a service specification associated with the network service.

5. The method of claim 1, further comprising implementing the network service, wherein implementing the network service includes at least one of:

provisioning the network service, upgrading the network service, downgrading the network service, and ceasing the network service.

6. A system for configuring a service network, the system comprising:

a computing platform comprising at least one processor and memory; and a management module (MM) utilizing the at least one processor and the memory, wherein the MM is configured to collect parameters defining a network service, wherein the network service comprises a multi-point to multi-point (MP2MP) Ethernet and/or a non-Ethernet packet technology service; generate a plurality of flow interfaces for modeling the network service based on the collected parameters, wherein each of the flow interfaces is associated with a logical device; generate at least one packet virtual network (PVN) including at least a portion of the plurality of generated flow interfaces; display, in a first screen of a graphical user interface on a computer screen, a graphical representation of the network service based on interface connectivities between the plurality of generated flow interfaces, including displaying a graphical depiction of the at least one generated PVN; and display, in a second screen of the graphical user interface on the computer screen, a textual representation of the network service based on the interface connectivities between the plurality of generated flow interfaces and the at least one generated PVN, wherein displaying the textual representation includes displaying a service configuration of the network service populated with at least the collected parameters, and wherein displaying the textual representation includes displaying the at least one PVN and the portion of the plurality of generated flow interfaces by displaying a textual network name of the PVN and a nested list of textual edges for each generated flow interface of the portion of the plurality of generated flow interfaces, wherein the management module is configured to configure the graphical user interface such that the graphical representation of the network service and the textual representation of the network service are interactively interdependent on one another, including automatically updating both the first and second screens of the graphical user interface in response to changes made to either the graphical representation of the network service or the textual representation of the network service, including:

receiving, from a user, textual input in the second screen of the GUI modifying the service configuration of the network service and automatically updating the graphical representation of the network service; and receiving, from the user, graphical input in the first screen of the GUI modifying the graphical representation of the network service and automatically updating the service configuration of the network service;

wherein receiving, from a user, textual input in the second screen of the GUI modifying the service configuration of the network service and automatically updating the graphical representation of the network service comprises receiving a textual input of an access site with a service location address and automatically populating the graphical representation of the network service with a node representing the access site, and wherein receiving, from the user, graphical input in the first screen of the GUI modifying the graphical representation of the network service and automatically updating the service configuration of the network service comprises receiving a resource allocation in the form of a service node and automatically populating the service configuration with a textual representation corresponding to a different access site with an address of the service location.

7. The system of claim 6, wherein the packet technology service comprises an internet service, a Web service, a streaming service, an Electronic-Mail (E-Mail) service, a phone service, a Voice over IP (VoIP) service, a Direct Internet Access (DIA) service, an Internet Protocol Television (IPTV) service, or a Virtual Private Network (VPN) service.

8. A non-transitory computer readable medium comprising computer executable instructions embodied in the computer readable medium that when executed by a processor of a computer perform steps comprising:

collecting parameters defining a network service, wherein the network service comprises a multi-point to multi-point (MP2MP) Ethernet and/or a non-Ethernet packet technology service;

generating a plurality of flow interfaces for modeling the network service based on the collected parameters, wherein each of the flow interfaces is associated with a logical device;

generating at least one packet virtual network (PVN) including at least a portion of the plurality of generated flow interfaces; and visually outputting displaying, in a service network first screen of a graphical user interface on a computer screen, a graphical representation of the network service based on interface connectivities between the plurality of generated flow interfaces, including displaying a graphical depiction of the at least one generated PVN;

displaying, in a second screen of the graphical user interface on the computer screen, a textual representation of the network service based on the interface connectivities between the plurality of generated flow interfaces and the at least one generated PVN, wherein displaying the textual representation includes displaying a service configuration of the network service populated with at least the collected parameters, and wherein displaying the textual representation includes displaying the at least one PVN and the portion of the plurality of generated flow interfaces by displaying a textual network name of the PVN and a nested list of textual edges for each generated flow interface of the portion of the plurality of generated flow interfaces; and configuring the graphical user interface such that the graphical representation of the network service and the textual representation of the network service are interactively interdependent on one another, including automatically updating both the first and second screens of the graphical user interface in response to changes made to either the graphical representation of the network service or the textual representation of the network service, including:

receiving ,from a user, textual input in the second screen of the GUI modifying the service configuration of the network service and automatically updating the graphic representation of the network service; and receiving, from the user, graphical input in the first screen of the GUI modifying the graphical representation of the network service and automatically updating the service configuration of the network service;

wherein receiving ,from a user, textual input in the second screen of the GUI modifying the service configuration of the network service and automatically updating the graphical representation of the network service comprises receiving a textual input of an access site with a service location address and automatically populating the graphical representation of the network service with a node representing the access site, and wherein receiving, from the user, graphical input in the first screen of the GUI modifying the graphical representation of the network service and automatically updating the service configuration of the network service comprises receiving a resource allocating in the form of a service node and automatically populating the service configuration with a textual representation corresponding to a different access site with an address of the service location.

* * * * *

UNITED STATES PATENT AND TRADEMARK OFFICE
CERTIFICATE OF CORRECTION

PATENT NO. : 10,230,589 B2
APPLICATION NO. : 14/569591
DATED : March 12, 2019
INVENTOR(S) : Latham et al.

Page 1 of 1

It is certified that error appears in the above-identified patent and that said Letters Patent is hereby corrected as shown below:

In the Claims

In Column 19, Line 26, in Claim 7, delete "internet" and insert -- Internet --, therefor.

In Column 20, Line 26, in Claim 8, delete "receiving ,from" and insert -- receiving, from --, therefor.

In Column 20, Line 29, in Claim 8, delete "graphic" and insert -- graphical --, therefor.

In Column 20, Line 37, in Claim 8, delete "receiving ,from" and insert -- receiving, from --, therefor.

In Column 20, Line 49, in Claim 8, delete "allocating" and insert -- allocation --, therefor.

Signed and Sealed this
Third Day of March, 2020

Andrei Iancu
*Director of the United States Patent and Trademark Office*